(12) United States Patent
Kumar et al.

(10) Patent No.: US 11,429,732 B2
(45) Date of Patent: Aug. 30, 2022

(54) UNLOCKING ELECTRONIC NOTEPADS FOR WRITING

(71) Applicant: Intel Corporation, Santa Clara, CA (US)

(72) Inventors: Arvind Kumar, Beaverton, OR (US); James M. Okuley, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1732 days.

(21) Appl. No.: 15/089,169

(22) Filed: Apr. 1, 2016

(65) Prior Publication Data
US 2017/0286704 A1  Oct. 5, 2017

(51) Int. Cl.
*G06F 21/62* (2013.01)
*G06F 21/31* (2013.01)

(52) U.S. Cl.
CPC .............. *G06F 21/62* (2013.01); *G06F 21/31* (2013.01)

(58) Field of Classification Search
CPC .......... G06F 21/62; G06F 21/31; G06F 21/35; G06F 21/316; G06F 21/10; G06F 2221/2141; G06F 2221/2113
USPC ......................................................... 726/17
See application file for complete search history.

(56) References Cited

U.S. PATENT DOCUMENTS

| | | | | |
|---|---|---|---|---|
| 2012/0046077 A1* | 2/2012 | Kim | ................. | H04M 1/72469 455/566 |
| 2012/0242603 A1* | 9/2012 | Engelhardt | ............. | G06F 21/32 345/173 |
| 2013/0271432 A1 | 10/2013 | Tsui et al. | | |
| 2013/0332354 A1* | 12/2013 | Rhee | .................... | G06Q 20/322 705/41 |
| 2014/0250522 A1* | 9/2014 | Wang | ...................... | G06F 21/36 726/17 |
| 2014/0267147 A1* | 9/2014 | Buelow | ............... | G06F 3/03545 345/174 |
| 2014/0317759 A1* | 10/2014 | Lee | ....................... | G06F 3/0483 726/28 |
| 2015/0033361 A1* | 1/2015 | Choi | ....................... | H04M 1/67 726/27 |
| 2015/0254471 A1* | 9/2015 | You | ...................... | G06F 21/6245 726/19 |
| 2015/0278503 A1* | 10/2015 | Zhang | .................... | G06F 21/36 726/16 |

FOREIGN PATENT DOCUMENTS

KR  20150111701 A  10/2015

OTHER PUBLICATIONS

International Search Report and Written Opinion for International Patent Application No. PCT/US2017/019883, dated Jun. 7, 2017, 15 pages.

* cited by examiner

*Primary Examiner* — Sanchit K Sarker
(74) *Attorney, Agent, or Firm* — Jordan IP Law, LLC (57) ABSTRACT

Systems, apparatuses and methods may provide for detecting an identifier communication from a writing implement and transitioning a previously modified interior page of an electronic notepad from a locked state to an unlocked state if the identifier communication corresponds to one or more stored identifiers. Moreover, a plurality of additional interior pages of the electronic notepad may be maintained in the locked state while the previously modified interior page is in the unlocked state.

24 Claims, 3 Drawing Sheets

UNLOCKING ELECTRONIC NOTEPADS FOR WRITING

TECHNICAL FIELD

Embodiments generally relate to electronic notepads. More particularly, embodiments relate to unlocking electronic notepads for writing.

BACKGROUND

Mobile systems/devices such as tablet computers and smart phones may be equipped with a touch screen, a stylus and an electronic notepad application that emulates a physical notepad. Electronic notepads, however, may have a number of functional differences from physical notepads that detract from the user experience. For example, for security reasons, conventional mobile devices may enter a locked state after a certain period of inactivity on the part of the user (e.g., the user stops writing to contemplate or handle other tasks). In such a case, unlocking the mobile device may involve user actions (e.g., entering login information) that delay the manual process of writing (e.g., compared to merely opening a physical notepad). Moreover, once the mobile device is unlocked, locating the most recently accessed page of the electronic notepad may involve a considerable amount of effort on the part of the user (e.g., compared to selecting a bookmarked or "rabbit-eared" page of a physical notepad).

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
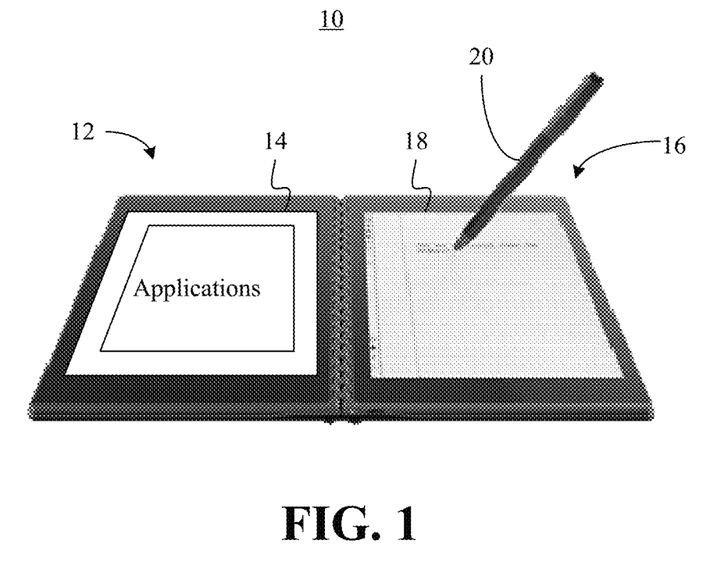
FIG. 1 is perspective view of an example of a user-based system according to an embodiment.

Turning now to FIG. 1, a user-based system 10 is shown in which a first portion 12 includes a first display 14 that presents applications (e.g., operating system/OS applications, user applications, etc.) and a second portion 16 includes a second display 18 that presents an electronic notepad (e.g., virtual scratch pad, "e-ink" screen). In this regard, the system 10 may also include a writing implement 20 (e.g., stylus, pen) that may be used by an individual (e.g., person, author, user, not shown) to handwrite information onto pages of the electronic notepad. In one example, the displays 14, 18 are touchscreens, although other interaction technologies may also be used. As will be discussed in greater detail, the system 10 may enable layered access to the pages of the electronic notepad that achieves an optimal balance between security and user convenience. Although the illustrated system 10 has a convertible tablet form factor, other form factors may also be used. For example, the system 10 might include a smart phone, personal digital assistant (PDA), wearable device (e.g., smart watch, eyewear, clothing, jewelry, etc.), media player, notebook computer, desktop computer, kiosk, and so forth.

Figure 2:
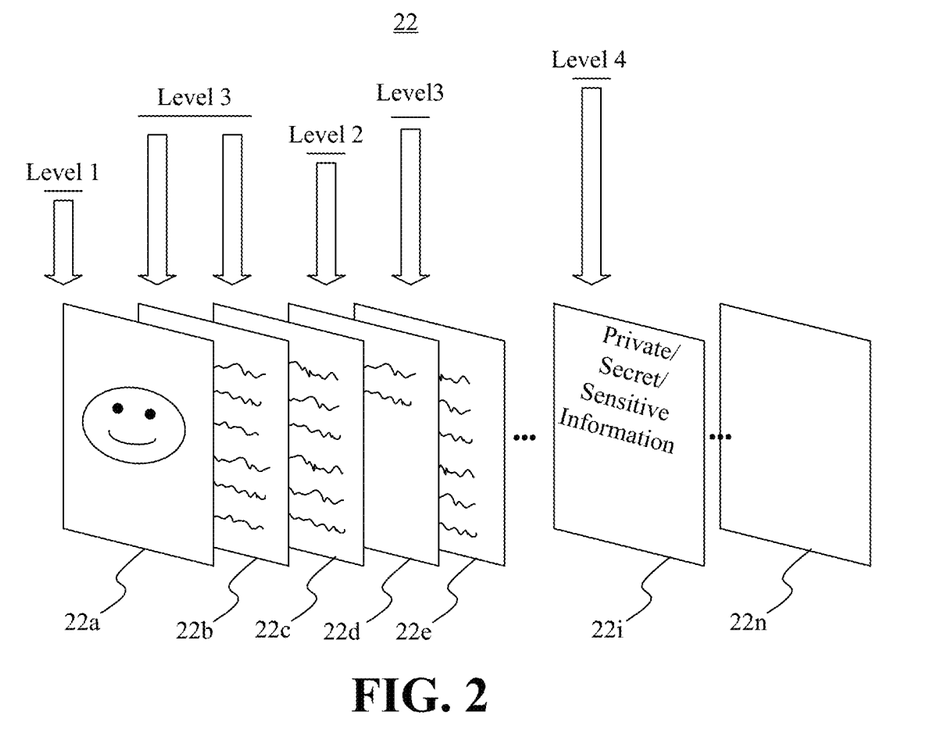
FIG. 2 is an illustration of a set of electronic notepad pages according to an embodiment.

FIG. 2 shows a set of electronic notepad pages 22 (22a-22n) that may be presented, accessed and edited on a display such as, for example, the second display 18 (FIG. 1). In the illustrated example, various levels of access are established based on the status of the interaction between the user and the mobile system. More particularly, a first level ("Level 1") may enable access only to a cover page 22a and a second level ("Level 2") may enable additional access to a previously modified interior page 22d (e.g., current and/or most recently edited page). Additional interior pages may include one or more non-private pages 22b, 22c, 22e that are accessed at a third level ("Level 3") and one or more private pages 22i (e.g., containing secret and/or sensitive information) that are accessed at a fourth level ("Level 4"). The non-private pages 22b, 22c, 22e may be considered to contain confidential information to the extent that they have a greater level of protection than the cover page 22a and the previously modified interior page 22d.

As the access level increases, the criteria for granting access may become more stringent. For example, a lifting motion of the writing implement, a button press on the writing implement and/or mere proximity between the writing implement and the system containing the electronic notepad may automatically transition the cover page 22a from a locked state to an unlocked state (i.e., unlocking Level 1). By contrast, in order to transition the previously modified interior page 22d from the locked state to the unlocked state (i.e., unlocking Level 2), the system might validate an identifier (ID) communication from the writing implement, wherein the identifier communication contains a unique ID of the writing implement. The unique ID of the writing implement may be registered and stored beforehand during, for example, a training phase/procedure. The Level 2 usage model may therefore closely emulate a physical notepad usage model in which the individual is able to open the notepad to a bookmarked page (or a page with a folded corner) and immediately continue writing. Moreover, security concerns may be obviated by maintaining the additional interior pages such as, for example, the non-private pages 22b, 22c and the private page 22i in the locked state while the electronic notepad is at Level 2.

In order to transition the non-private pages 22b, 22c from the locked state to the unlocked state (e.g., unlocking Level 3), the system may validate a writing pattern (e.g., handwriting style, speed of writing, angle of the writing implement, pressure applied to the implement tip) with regard to the previously modified interior page 22d of the electronic notepad. In some implementations, a special region (e.g., text box, not shown) may be designated on the previously modified interior page 22d or the cover page 22a where the individual signs or writes a specific pre-defined pattern to be verified. The writing pattern may also be registered and stored during the training phase/procedure. Of particular note is that the private page 22i may be maintained in the locked state while the electronic notepad is at Level 3.

Additionally, transitioning the private page 22i from the locked state to the unlocked state (e.g., unlocking Level 4), may involve validating a login request (e.g., user identifier, password, personal identification number/PIN, biometric data, authentication token from another wearable device, etc.). Level 4 may also enable the individual to perform other actions such as, for example, clearing handwriting training data (e.g., if the system is transferred to another individual), clearing the registered ID of the writing implement, adding a new unique ID of another writing implement, marking/designating the current page, changing the contents of the cover page 22a, define a specific region or text box on the previously modified interior page 22d or the cover page 22a (e.g., including the pre-determined pattern), and so forth. With regard to the current page, any interior page such as, for example, the non-private page 22c may be designated as the current page (e.g., if the individual is editing previously handwritten content).

Figure 3:
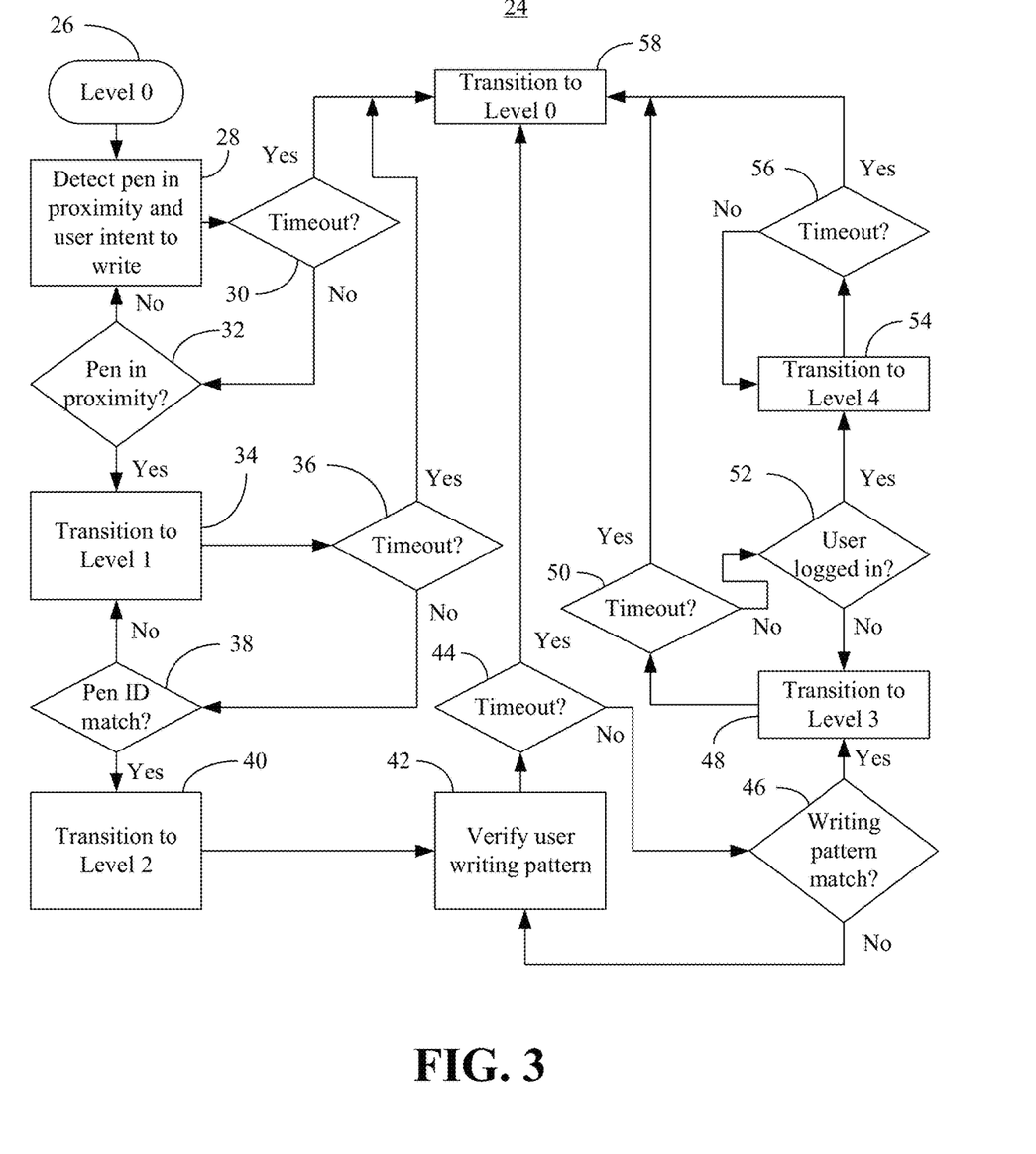
FIG. 3 is a flowchart of an example of a method of operating a notepad management apparatus according to an embodiment.

FIG. 3 shows a method 24 of operating a notepad management apparatus. The method 24 may generally be implemented in a system such as, for example, the system 10 (FIG. 1). More particularly, the method 24 may be implemented in one or more modules as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof. For example, computer program code to carry out operations shown in method 24 may be written in any combination of one or more programming languages, including an object oriented programming language such as JAVA, SMALLTALK, C++ or the like and conventional procedural programming languages, such as the "C" programming language or similar programming languages.

Illustrated processing block 26 begins at "Level 0" in which no pages of the electronic notepad are visible (i.e., all pages are in the locked state). Block 28 may detect a writing implement (e.g., a pen) in proximity to the electronic notepad and/or a user intent to write. A determination may be made at block 30 as to whether a timeout has occurred. If not, illustrated block 32 confirms whether the pen is still in proximity to the electronic notepad. Blocks 28 and 32 may be conducted in different ways depending on the circumstances. In one example, the approach of the stylus to the system is detected, wherein a stylus signal may be detected within, for example, about 15-20 cm of proximity to the screen and within a few miliseconds (~15-30 ms). In some implementations, the writing implement may not be continuously transmitting in order to conserve power. In such a case, the writing implement may include an accelerometer to sense motion, or a specific motion such as lifting the writing implement. The detected motion may then trigger the transmission of the stylus signal. Therefore, by the time the writing implement comes within proximity of the device, it may be transmitting a signal that is detected by the system containing the electronic notepad. In another scenario, the writing implement may include a physical button that uses Bluetooth or some other longer range signal to wake the system. Accordingly, pressing the button may also signify the user intent to write.

If the proximity condition is not satisfied at block 32, the illustrated method 24 returns to block 28. If the proximity condition is satisfied, illustrated block 34 transitions the electronic notepad to Level 1 by unlocking only the cover page. Block 36 may then determine whether a timeout has occurred. If no timeout has occurred, illustrated block 38 determines whether the unique ID of the writing implement corresponds to one or more stored identifiers. In this regard, the writing implement may be assigned a globally unique ID (e.g., in accordance with a standard such as, for example, the USI/Universal Stylus Initiative standard). The unique ID may be communicated via a downlink to the system containing the electronic notepad. As already noted, the user may register the writing implement with the system when user is logged in and has full access to the system. During the registration, the globally unique ID of the writing implement may be transmitted by the writing implement to the system, and stored on the system in a non-volatile memory (NVM). Once the registration is complete, the unique ID may be used later to authenticate the writing implement. Accordingly, when the user brings the writing implement into proximity of the system, the writing implement may send the unique ID to the system, wherein the system matches the received ID with the registered ID.

If a match is not detected at block 38 (e.g., the identifier communication does not correspond to one or more stored identifiers), the illustrated method 24 returns to block 34 and maintains the electronic notepad at Level 1 (e.g., maintaining all pages except the cover page in the locked state). If a match is detected at block 38, block 40 may transition the electronic notepad to Level 2 by unlocking the current page (e.g., a previously modified interior page) in addition to the cover page. Block 40 may be conducted relatively quickly (e.g., within 50-100 ms), so that there are no usability concerns with regard to delays.

Block 42 may then record and/or analyze the writing activity on the current page. Block 42 may provide for documenting the handwriting style, speed of writing, angle of the writing implement, pressure applied to the implement tip, and so forth. A determination may be made at block 44 as to whether a timeout has occurred. If not, illustrated block 46 determines whether the writing activity corresponds to one or more stored writing patterns. More particularly, a training phase/procedure may be conducted while the user is writing on the device in Level 4 (i.e., fully unlocked system). It may be assumed that a user having access to the system in the Level 4 state is the rightful owner and an authenticated user. Of particular note is that the training phase may not require any explicit act from the user. Rather, the training phase may be conducted in the background when user is writing on the electronic notepad. For example, the user might write for less than five minutes in order to collect enough writing activity data to conduct a match. Once the data is collected, it may be stored (e.g., in NVM) for future verifications of user writing patterns. Thus, while the user is writing on the current page in Level 2, the writing pattern may be implicitly verified against the stored patterns. As already noted, a special region (e.g., a text box) may also be designated on the current page or the cover page for signing or writing a specific pre-defined verification pattern.

If no match is detected at block 46 (e.g., the writing activity does not correspond to at least one of the stored writing patterns), the illustrated method 24 returns to block 42 and continues to record and/or analyze the writing activity. If a match is detected at block 46, block 48 may transition the electronic notepad to Level 3 by unlocking one or more non-private pages of the notepad (e.g., enabling the individual to view and/or edict earlier work). A determination may then be made at block 50 as to whether a timeout has occurred. If a timeout has not occurred at block 50, illustrated block 52 determines whether a login request corresponds to stored login information (e.g., the user has successfully logged into the system). If the user has not successfully logged into the system, the illustrated method 24 returns to block 48 and maintains the electronic notepad at Level 3 (e.g., maintaining private pages in the locked state).

If it is determined at block 52 that the user has successfully logged into the system, block 54 may transition the electronic notepad to Level 4 by unlocking one or more private pages of the notepad. Illustrated block 56 determines whether a timeout has occurred. If a timeout has not occurred at block 56, the method 24 may return to block 54 and maintain the electronic notepad at Level 4. If a timeout is detected at blocks 30, 36, 44, 50 or 56, illustrated block 58 transitions the electronic notepad back to Level 0 by placing all pages of the notepad in the locked state. Returning the electronic notepad to Level 0 during periods of inactivity may enhance security as well as reduce power consumption.

Similar to verifying the user writing pattern as described above, there may be alternative ways of verifying the user (e.g., depending on cost implications). For example, the writing implement may include one or more barrel pressure sensors that enable detection of the grip of the user. Since each user may hold the writing implement in a unique way, grip, pressure and angle sensors in the writing implement may generate a unique ID of the user for authentication. Additionally, the writing implement may include a fingerprint sensor, wherein as the user holds the writing implement, fingerprint information may be verified by the system. Moreover, the writing implement may establish a Bluetooth communication link to a wearable device, such as, for example, a smart watch, a security wristband etc. In such a case, the wearable device may provide the writing implement with a user authentication token that the writing implement presents to the system. Such an approach may enable the individual to use multiple pens to write, since the authentication data is provided by the secure wearable device. In addition, depending on the level of authentication provided by the wearable device, the system may enter Level 3 or even Level 4 (e.g., if fingerprint data is used).

Figure 4:
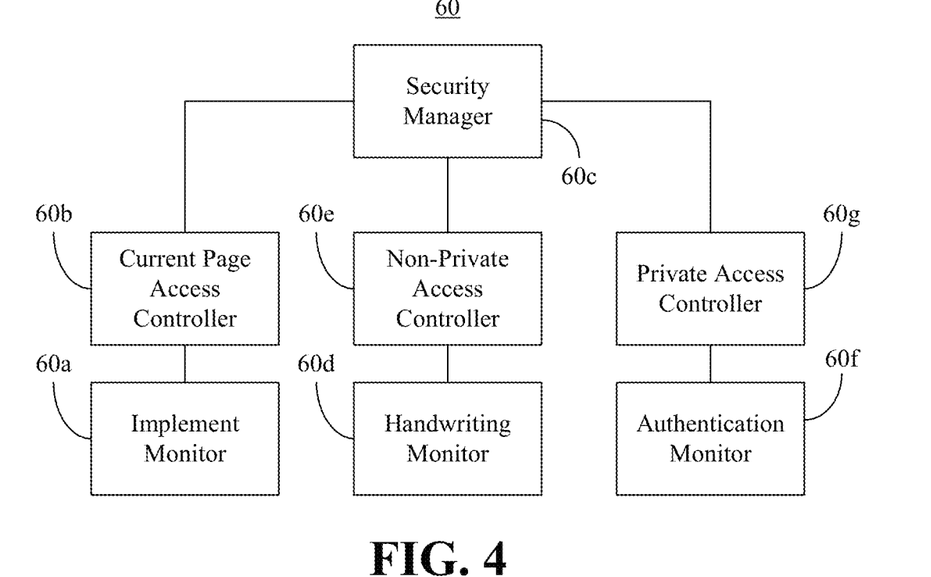
FIG. 4 is a block diagram of an example of a notepad management apparatus according to an embodiment.

FIG. 4 shows a notepad management apparatus 60 (60a-60g) that may be used to enhance user experience with respect to a system such as the user-based system 10 (FIG. 1). The apparatus 60, which may include fixed-functionality logic hardware, configurable logic, logic instructions, etc., or any combination thereof, may generally implement one or more aspects of the method 24 (FIG. 3), already discussed. In the illustrated example, the apparatus 60 includes an implement monitor 60a to detect an identifier communication originating from a writing implement (e.g., stylus, pen, not shown) and a current page access controller 60b to transition a previously modified interior page of an electronic notepad from a locked state to the unlocked state if the identifier communication corresponds to one or more stored identifiers. Additionally, a security manager 60c may maintain a plurality of additional interior pages of the electronic notepad in the locked state while the previously modified interior page is in the unlocked state. Moreover, the security manager 60c may maintain the previously modified interior page in the locked state if the identifier communication does not correspond to at least one of the one or more stored identifiers.

The apparatus 60 may also include a handwriting monitor 60d to detect writing activity with respect to the writing implement and the previously modified interior page, wherein the plurality of additional interior pages include one or more private pages and one or more non-private pages. Additionally, a non-private access controller 60e may transition the one or more non-private pages from the locked state to the unlocked state if the writing activity corresponds to one or more stored writing patterns. In such a case, the security manager 60c may maintain the one or more private pages in the locked state while the one or more non-private pages are in the locked state. If, however, the writing activity does not correspond to at least one of the one or more stored writing patterns, the security manager 60c may also maintain the one or more non-private pages in the locked state.

The illustrated apparatus 60 also includes an authentication monitor 60f to detect a login request and a private access controller 60g to transition the one or more private pages from the locked state to the unlocked state if the login request corresponds to stored login information. The security manager 60c may maintain the one or more private pages in the locked state if the login request does not correspond to the stored login information.

Figure 5:
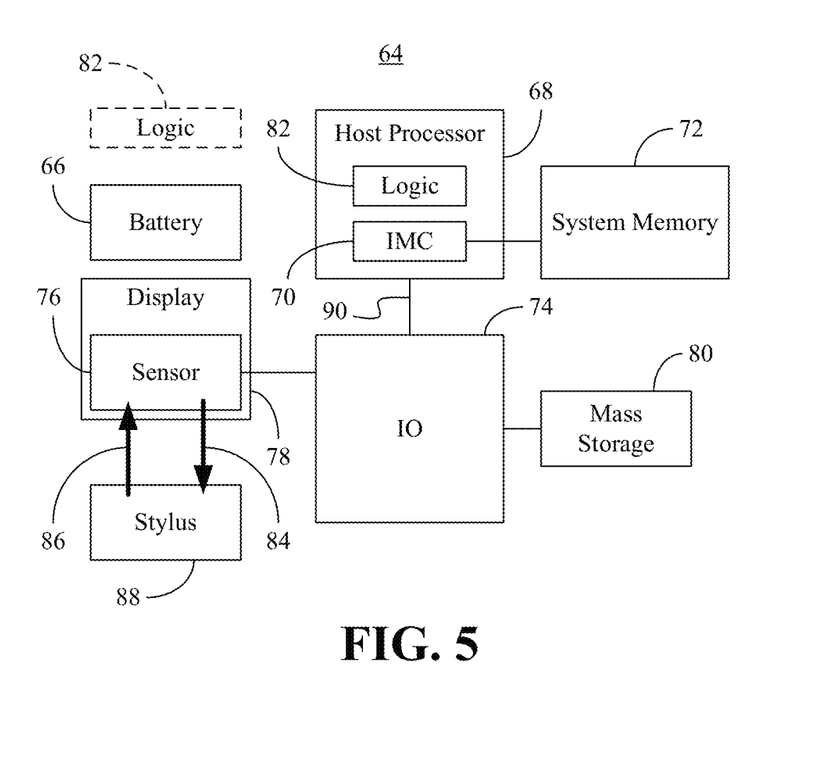
FIG. 5 is a block diagram of an example of a user-based system according to an embodiment.

Turning now to FIG. 5, a user-based system 64 is shown. The system 64 may be readily substituted for the user-based system 10 (FIG. 1), already discussed. In the illustrated example, the system 64 includes a battery 66 to supply power to the system 64 and a host processor 68 (e.g., central processing unit/CPU) having an integrated memory controller (IMC) 70, which may communicate with system memory 72. The system memory 72 may include, for example, dynamic random access memory (DRAM) configured as one or more memory modules such as, for example, dual inline memory modules (DIMMs), small outline DIMMs (SODIMMs), etc.

The illustrated system 64 also includes an input output (IO) module 74 implemented together with the host processor 68 on a semiconductor die (not shown) as a system on chip (SoC), wherein the IO module 74 functions as a host device and may communicate with, for example, a display 78 and mass storage 80 (e.g., flash memory, block storage, solid state disk/SSD, etc.). The display 78 may include, for example, a sensor 76 (e.g., capacitive touch sensor layer) having an array of electrodes arranged in a grid pattern that detects changes in capacitance. In one example, the sensor 76 maintains an uplink 84 and a downlink 86 with a stylus 88 (e.g., writing implement) and the display 78 presents an electronic notepad. The display 78 may also interact with the stylus 88 via a passive conductive element (e.g., passive tip) of the stylus 88 or wireless signals transmitted by the stylus 88.

For example, the stylus 88 might include a tip that transmits a signal by modulating the voltage of the tip of the stylus 88. These voltage modulations may then couple to the electrodes in the sensor 76 in the form of the downlink 86. The spatial profile of the downlink 86 voltage signal may be used by the IO module 74 to locate the stylus 88, and the voltage modulation may be used to communicate ancillary data such as, for example, force, pen unique ID and button presses. The communication between the stylus 88 and the display 78 may be near field communications (NFC) that are limited to a distance of a few centimeters. Moreover, the location and ancillary data from the stylus 88 may be communicated from the IO module 74 to the host processor 68 via an interface 90 such as, for example, an I²C (Inter-Integrated Circuit, e.g., I2C Specification UM10204, Rev. 03, Jun. 19, 2007, NXP Semiconductors), USB (Universal Serial Bus, e.g., USB Specification 3.1, Rev. 1.0, Jul. 26, 2013, USB Implementers Forum) and/or SPI (Serial Peripheral Interface) or any other suitable type of bus.

In a typical touch enabled interaction, an array of X-lines may be driven in the sensor 76. After driving the lines, a perpendicular array of Y-lines may be sensed to measure the capacitance levels and capacitance changes. The voltage may also be modulated to create a signal on the X-line electrodes. Such a signal may be received by the stylus 88 in the form of the uplink 84, wherein the uplink 84 may be used to transmit configuration and timing information from the IO module 74 through the sensor 76 to the stylus 88. Accordingly, the two way communication between the display 78 and the stylus 88 may enable data to be exchanged in order to conduct "in-range" discovery, capability discovery and data transfer.

Additionally, the system memory 72 and/or the mass storage 80 may be part of a memory subsystem that stores one or more identifiers. The memory subsystem may also include cache, registers, and so forth. The host processor 68 may include logic 82 (e.g., implemented in logic instructions, configurable logic, fixed-functionality logic hardware, etc., or any combination thereof) that causes the host processor 68 to operate as a notepad management apparatus such as, for example, the apparatus 60 (FIG. 4), already discussed. More particularly, the logic 82 may detect an identifier communication originating from the stylus 88. The identifier communication may be obtained, for example, via the downlink 86, the sensor 76 and the IO module 74. Additionally, the logic 82 may transition a previously modified interior page of the electronic notepad from a locked state to an unlocked state if the identifier communication corresponds to one or more of the identifiers stored in the memory subsystem. The logic 82 may also maintain a plurality of additional interior pages of the electronic notepad in the locked state while the previously modified interior page is in the unlocked state. In one example, the logic 82 maintains the previously modified interior page in the locked state if the identifier communication does not correspond to at least one of the one or more stored identifiers. The logic 82, which may be implemented elsewhere in the system 64, may also selectively unlock non-private pages, private pages, and so forth, in a manner that closely emulates the usage of a physical notepad.

ADDITIONAL NOTES AND EXAMPLES

Example 1 may include a user-based system comprising a writing implement, a display to present an electronic notepad, a memory subsystem to store one or more identifiers, and a notepad access subsystem comprising an implement monitor to detect an identifier communication originating from the writing implement, a current page access controller to transition a previously modified interior page of the electronic notepad from a locked state to an unlocked state if the identifier communication corresponds to the stored one or more identifiers, and a security manager to maintain a plurality of additional interior pages of the electronic notepad in the locked state while the previously modified interior page is in the unlocked state.

Example 2 may include the system of Example 1, wherein the memory is to store one or more writing patterns and the notepad access subsystem further includes a handwriting monitor to detect writing activity with respect to the writing implement and the previously modified interior page, wherein the plurality of additional interior pages include one or more private pages and one or more non-private pages, a non-private access controller to transition the one or more non-private pages from the locked state to the unlocked state if the writing activity corresponds to the stored one or more writing patterns, wherein the security manager is to maintain the one or more private pages in the locked state while the one or more non-private pages are in the unlocked state.

Example 3 may include the system of Example 2, wherein the security manager is to maintain the one or more non-private pages in the locked state if the writing activity does not correspond to at least one of the one or more stored writing patterns.

Example 4 may include the system of Example 2, wherein the memory subsystem is to store login information and the notepad access subsystem further includes an authentication monitor to detect a login request, and a private access controller to transition the one or more private pages from the locked state to the unlocked state if the login request corresponds to the stored login information.

Example 5 may include the system of Example 4, wherein the security manager is to maintain the one or more private pages in the locked state if the login request does not correspond to the stored login information.

Example 6 may include the system of any one of Examples 1 to 6, wherein the security manager is to maintain the previously modified interior page in the locked state if the identifier communication does not correspond to at least one of the one or more stored identifiers.

Example 7 may include a notepad management apparatus comprising an implement monitor to detect an identifier communication originating from a writing implement, a current page access controller to transition a previously modified interior page of an electronic notepad from a locked state to an unlocked state if the identifier communication corresponds to one or more stored identifiers, and a security manager to maintain a plurality of additional interior pages of the electronic notepad in the locked state while the previously modified interior page is in the unlocked state.

Example 8 may include the apparatus of Example 7, further including a handwriting monitor to detect writing activity with respect to the writing implement and the previously modified interior page, wherein the plurality of additional interior pages include one or more private pages and one or more non-private pages, a non-private access controller to transition the one or more non-private pages from the locked state to the unlocked state if the writing activity corresponds to one or more stored writing patterns, wherein the security manager is to maintain the one or more private pages in the locked state while the one or more non-private pages are in the unlocked state.

Example 9 may include the apparatus of Example 8, wherein the security manager is to maintain the one or more non-private pages in the locked state if the writing activity does not correspond to at least one of the one or more stored writing patterns.

Example 10 may include the apparatus of Example 8, further including an authentication monitor to detect a login request, and a private access controller to transition the one or more private pages from the locked state to the unlocked state if the login request corresponds to stored login information.

Example 11 may include the apparatus of Example 10, wherein the security manager is to maintain the one or more private pages in the locked state if the login request does not correspond to the stored login information.

Example 12 may include the apparatus of any one of Examples 7 to 11, wherein the security manager is to maintain the previously modified interior page in the locked state if the identifier communication does not correspond to at least one of the one or more stored identifiers.

Example 13 may include a method of operating a notepad management apparatus comprising detecting an identifier communication originating from a writing implement, transitioning a previously modified interior page of an electronic notepad from a locked state to an unlocked state if the identifier communication corresponds to one or more stored identifiers, and maintaining a plurality of additional interior pages of the electronic notepad in the locked state while the previously modified interior page is in the unlocked state.

Example 14 may include the method of Example 13, further including detecting writing activity with respect to the writing implement and the previously modified interior page, wherein the plurality of additional interior pages include one or more private pages and one or more non-private pages, transitioning the one or more non-private pages from the locked state to the unlocked state if the writing activity corresponds to one or more stored writing patterns, and maintaining the one or more private pages in the locked state while the one or more non-private pages are in the unlocked state.

Example 15 may include the method of Example 14, further including maintaining the one or more non-private pages in the locked state if the writing activity does not correspond to at least one of the one or more stored writing patterns.

Example 16 may include the method of Example 14, further including detecting a login request, and transitioning the one or more private pages from the locked state to the unlocked state if the login request corresponds to stored login information.

Example 17 may include the method of Example 16, further including maintaining the one or more private pages in the locked state if the login request does not correspond to the stored login information.

Example 18 may include the method of any one of Examples 13 to 17, further including maintaining the previously modified interior page in the locked state if the identifier communication does not correspond to at least one of the one or more stored identifiers.

Example 19 may include at least one computer readable storage medium comprising a set of instructions, which when executed by a computing device, cause the computing device to detect an identifier communication originating from a writing implement, transition a previously modified interior page of an electronic notepad from a locked state to an unlocked state if the identifier communication corresponds to one or more stored identifiers, and maintain a plurality of additional interior pages of the electronic notepad in the locked state while the previously modified interior page is in the unlocked state.

Example 20 may include the at least one computer readable storage medium of Example 19, wherein the instructions, when executed, cause a computing device to detect writing activity with respect to the writing implement and the previously modified interior page, wherein the plurality of additional interior pages include one or more private pages and one or more non-private pages, transition the one or more non-private pages from the locked state to the unlocked state if the writing activity corresponds to one or more stored writing patterns, and maintain the one or more private pages in the locked state while the one or more non-private pages are in the unlocked state.

Example 21 may include the at least one computer readable storage medium of Example 20, wherein the instructions, when executed, cause a computing device to maintain the one or more non-private pages in the locked state if the writing activity does not correspond to at least one of the one or more stored writing patterns.

Example 22 may include the at least one computer readable storage medium of Example 20, wherein the instructions, when executed, cause a computing device to detect a login request, and transition the one or more private pages from the locked state to the unlocked state if the login request corresponds to stored login information.

Example 23 may include the at least one computer readable storage medium of Example 22, wherein the instructions, when executed, cause a computing device to maintain the one or more private pages in the locked state if the login request does not correspond to the stored login information.

Example 24 may include the at least one computer readable storage medium of any one of Examples 19 to 23, wherein the instructions, when executed, cause a computing device to maintain the previously modified interior page in the locked state if the identifier communication does not correspond to at least one of the one or more stored identifiers.

Example 25 may include a notepad management apparatus comprising means for detecting an identifier communication originating from a writing implement, means for transitioning a previously modified interior page of an electronic notepad from a locked state to an unlocked state if the identifier communication corresponds to one or more stored identifiers, and means for maintaining a plurality of additional interior pages of the electronic notepad in the locked state while the previously modified interior page is in the unlocked state.

Example 26 may include the apparatus of Example 25, further including means for detecting writing activity with respect to the writing implement and the previously modified interior page, wherein the plurality of additional interior pages include one or more private pages and one or more non-private pages, means for transitioning the one or more non-private pages from the locked state to the unlocked state if the writing activity corresponds to one or more stored writing patterns, and means for maintaining the one or more private pages in the locked state while the one or more non-private pages are in the unlocked state.

Example 27 may include the apparatus of Example 26, further including means for maintaining the one or more non-private pages in the locked state if the writing activity does not correspond to at least one of the one or more stored writing patterns.

Example 28 may include the apparatus of Example 26, further including means for detecting a login request, and means for transitioning the one or more private pages from the locked state to the unlocked state if the login request corresponds to stored login information.

Example 29 may include the apparatus of Example 28, further including means for maintaining the one or more private pages in the locked state if the login request does not correspond to the stored login information.

Example 30 may include the apparatus of any one of Examples 25 to 29, further including means for maintaining the previously modified interior page in the locked state if the identifier communication does not correspond to at least one of the one or more stored identifiers.

Techniques described herein may therefore provide a natural write-first user experience with regard to electronic notepads. Moreover, the techniques may achieve the optimal balance between security and ease-of-use.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A system comprising:
   a writing implement;
   a display to present an electronic notepad;
   a memory subsystem to store one or more identifiers; and
   a notepad management apparatus comprising,
      an implement monitor to detect an identifier communication originating from the writing implement;
      a current page access controller to transition a previously modified interior page of the electronic notepad from a locked state to an unlocked state if the identifier communication corresponds to the stored one or more identifiers; and
      a security manager to maintain a plurality of additional interior pages of the electronic notepad in the locked state while the previously modified interior page is in the unlocked state, wherein the previously modified interior page in the unlocked state and the plurality of additional interior pages in the locked state are both associated with a first user.

2. The system of claim 1, wherein the memory is to store one or more writing patterns and the notepad access subsystem further includes:
   a handwriting monitor to detect writing activity with respect to the writing implement and the previously modified interior page, wherein the plurality of additional interior pages include one or more private pages and one or more non-private pages;
   a non-private access controller to transition the one or more non-private pages from the locked state to the unlocked state if the writing activity corresponds to the stored one or more writing patterns, wherein the security manager is to maintain the one or more private pages in the locked state while the one or more non-private pages are in the unlocked state.

3. The system of claim 2, wherein the security manager is to maintain the one or more non-private pages in the locked state if the writing activity does not correspond to at least one of the one or more stored writing patterns.

4. The system of claim 2, wherein the memory subsystem is to store login information and the notepad access subsystem further includes:
   an authentication monitor to detect a login request; and
   a private access controller to transition the one or more private pages from the locked state to the unlocked state if the login request corresponds to the stored login information.

5. The system of claim 4, wherein the security manager is to maintain the one or more private pages in the locked state if the login request does not correspond to the stored login information.

6. The system of claim 1, wherein the security manager is to maintain the previously modified interior page in the locked state if the identifier communication does not correspond to at least one of the one or more stored identifiers.

7. An apparatus comprising:
   an implement monitor to detect an identifier communication originating from a writing implement;
   a current page access controller to transition a previously modified interior page of an electronic notepad from a locked state to an unlocked state if the identifier communication corresponds to one or more stored identifiers; and
   a security manager to maintain a plurality of additional interior pages of the electronic notepad in the locked state while the previously modified interior page is in the unlocked state, wherein the previously modified interior page in the unlocked state and the plurality of additional interior pages in the locked state are both associated with a first user.

8. The apparatus of claim 7, further including:
   a handwriting monitor to detect writing activity with respect to the writing implement and the previously modified interior page, wherein the plurality of additional interior pages include one or more private pages and one or more non-private pages;
   a non-private access controller to transition the one or more non-private pages from the locked state to the unlocked state if the writing activity corresponds to one or more stored writing patterns, wherein the security manager is to maintain the one or more private pages in the locked state while the one or more non-private pages are in the unlocked state.

9. The apparatus of claim 8, wherein the security manager is to maintain the one or more non-private pages in the locked state if the writing activity does not correspond to at least one of the one or more stored writing patterns.

10. The apparatus of claim 8, further including:
an authentication monitor to detect a login request; and
a private access controller to transition the one or more private pages from the locked state to the unlocked state if the login request corresponds to stored login information.

11. The apparatus of claim 10, wherein the security manager is to maintain the one or more private pages in the locked state if the login request does not correspond to the stored login information.

12. The apparatus of claim 7, wherein the security manager is to maintain the previously modified interior page in the locked state if the identifier communication does not correspond to at least one of the one or more stored identifiers.

13. A method comprising:
detecting an identifier communication originating from a writing implement;
transitioning a previously modified interior page of an electronic notepad from a locked state to an unlocked state if the identifier communication corresponds to one or more stored identifiers; and
maintaining a plurality of additional interior pages of the electronic notepad in the locked state while the previously modified interior page is in the unlocked state, wherein the previously modified interior page in the unlocked state and the plurality of additional interior pages in the locked state are both associated with a first user.

14. The method of claim 13, further including:
detecting writing activity with respect to the writing implement and the previously modified interior page, wherein the plurality of additional interior pages include one or more private pages and one or more non-private pages;
transitioning the one or more non-private pages from the locked state to the unlocked state if the writing activity corresponds to one or more stored writing patterns; and
maintaining the one or more private pages in the locked state while the one or more non-private pages are in the unlocked state.

15. The method of claim 14, further including maintaining the one or more non-private pages in the locked state if the writing activity does not correspond to at least one of the one or more stored writing patterns.

16. The method of claim 14, further including:
detecting a login request; and
transitioning the one or more private pages from the locked state to the unlocked state if the login request corresponds to stored login information.

17. The method of claim 16, further including maintaining the one or more private pages in the locked state if the login request does not correspond to the stored login information.

18. The method of claim 13, further including maintaining the previously modified interior page in the locked state if the identifier communication does not correspond to at least one of the one or more stored identifiers.

19. At least one non-transitory computer readable storage medium comprising a set of instructions, which when executed by a computing device, cause the computing device to:
detect an identifier communication originating from a writing implement;
transition a previously modified interior page of an electronic notepad from a locked state to an unlocked state if the identifier communication corresponds to one or more stored identifiers; and
maintain a plurality of additional interior pages of the electronic notepad in the locked state while the previously modified interior page is in the unlocked state, wherein the previously modified interior page in the unlocked state and the plurality of additional interior pages in the locked state are both associated with a first user.

20. The at least one non-transitory computer readable storage medium of claim 19, wherein the instructions, when executed, cause a computing device to:
detect writing activity with respect to the writing implement and the previously modified interior page, wherein the plurality of additional interior pages include one or more private pages and one or more non-private pages;
transition the one or more non-private pages from the locked state to the unlocked state if the writing activity corresponds to one or more stored writing patterns; and
maintain the one or more private pages in the locked state while the one or more non-private pages are in the unlocked state.

21. The at least one non-transitory computer readable storage medium of claim 20, wherein the instructions, when executed, cause a computing device to maintain the one or more non-private pages in the locked state if the writing activity does not correspond to at least one of the one or more stored writing patterns.

22. The at least one non-transitory computer readable storage medium of claim 20, wherein the instructions, when executed, cause a computing device to:
detect a login request; and
transition the one or more private pages from the locked state to the unlocked state if the login request corresponds to stored login information.

23. The at least one non-transitory computer readable storage medium of claim 22, wherein the instructions, when executed, cause a computing device to maintain the one or more private pages in the locked state if the login request does not correspond to the stored login information.

24. The at least one non-transitory computer readable storage medium of claim 19, wherein the instructions, when executed, cause a computing device to maintain the previously modified interior page in the locked state if the identifier communication does not correspond to at least one of the one or more stored identifiers.

* * * * *

UNITED STATES PATENT AND TRADEMARK OFFICE
CERTIFICATE OF CORRECTION

PATENT NO. : 11,429,732 B2
APPLICATION NO. : 15/089169
DATED : August 30, 2022
INVENTOR(S) : Kumar et al.

It is certified that error appears in the above-identified patent and that said Letters Patent is hereby corrected as shown below:

In the Claims

In Column 11, Line 57, In Claim 1, delete "comprising," and insert --comprising:-- therefor.

Signed and Sealed this
Twenty-eighth Day of February, 2023

*Katherine Kelly Vidal*

Katherine Kelly Vidal
*Director of the United States Patent and Trademark Office*